Oct. 4, 1966

G. H. BALDING 3,277,471

RADAR DATA CONVERTER

Filed March 3, 1964

INVENTOR.
GEORGE H. BALDING
BY
*Henry Hausen*
ATTORNEY

Oct. 4, 1966     G. H. BALDING     3,277,471
RADAR DATA CONVERTER
Filed March 3, 1964     2 Sheets-Sheet 2

TERRAIN PROFILE DISPLAY
AT ONE AZIMUTH HEADING

INVENTOR.
GEORGE H. BALDING
BY
ATTORNEY

United States Patent Office 3,277,471
Patented Oct. 4, 1966

3,277,471
RADAR DATA CONVERTER
George H. Balding, Fremont, Calif., assignor, by mesne assignments, to the United States of America as represented by the Secretary of the Navy
Filed Mar. 3, 1964, Ser. No. 349,188
10 Claims. (Cl. 343—11)

This invention relates to a radar data converter and more particularly to a radar data converter for converting radar video information from a radar system having no vertical antenna scan into a two-dimensional terrain profile visual presentation providing a plot of elevation as a function of range in a fixed azimuth plane.

Developments in aircraft instrumentation in display systems have progressed to a point where a pilot may be apprised of real world conditions external to the aircraft by means of visual display. One such system comprises a two-dimensional display of terrain profile which presents in visual form to a pilot a plot of elevation as a function of range in a fixed azimuth plane. Such a visual display system is readily compatible with a radar system of an aircraft having vertical antenna scan capability since such a radar system may provide terrain information over intermedite ranges located between the antenna of the radar and the target which provides the pulse echo.

The present invention contemplates a radar data converter and display system for use with radar not having antenna vertical scan capability. The present invention is directed to the provision of a radar data converter and display system wherein the need for scanning an antenna in a vertical direction is eliminated. By means of the present invention an aircraft pilot is provided with a two-dimensional terrain profile presentation providing a plot of elevation as a function of range at a fixed azimuth plane which is usually determined by the heading of the aircraft. Although a radar system without vertical antenna scan capability provides radar video information of earth's elevation at a range fixed by the depression angle of the radar system antenna, a fairly representative presentation of earth elevation as a function of range is provided by the present invention when the aircraft is flown at the same azimuth heading for minimum periods of time.

The present invention is a modification of patent application Serial No. 126,436 of George H. Balding for Radar Display Converter, now Patent No. 3,246,330. The present invention greatly enhances the utility of the radar display converter set forth in the above patent application by providing a display in the form of a two-dimensional terrain profile presentation. This involves a plot of earth elevation as a function of range at a fixed azimuth plane utilizing radar data received from a radar system having no vertical antenna scan capability. It is pointed out that although the present invention is designed for use with radar systems having no vertical antenna scan it may also be used with radar systems whether or not such have horizontal antenna scan capability.

Therefore, it is an object of the present invention to provide a radar data converter for use with radar equipment having no vertical antenna scan capability for providing a presentation of terrain profile at one azimuth.

It is another object of the present invention to provide a two-dimensional display of terrain profile at a fixed azimuth as a plot of earth elevation as a function of range wherein aircraft speed is simulated by movement of the terrain profile across the face of the display tube.

A further object of the present invention is to provide a radar display converter capable of utilizing range-to-target video information received from a radar antenna having a fixed depression angle and a constant azimuth heading for generating a plurality of terrain information signals for various ranges to provide a terrain profile display at one azimuth on a cathode ray tube.

Other objects and many of the attendant advantages of this invention will become apparent with the reading of the following specification in conjunction with the drawings.

Figure 1:
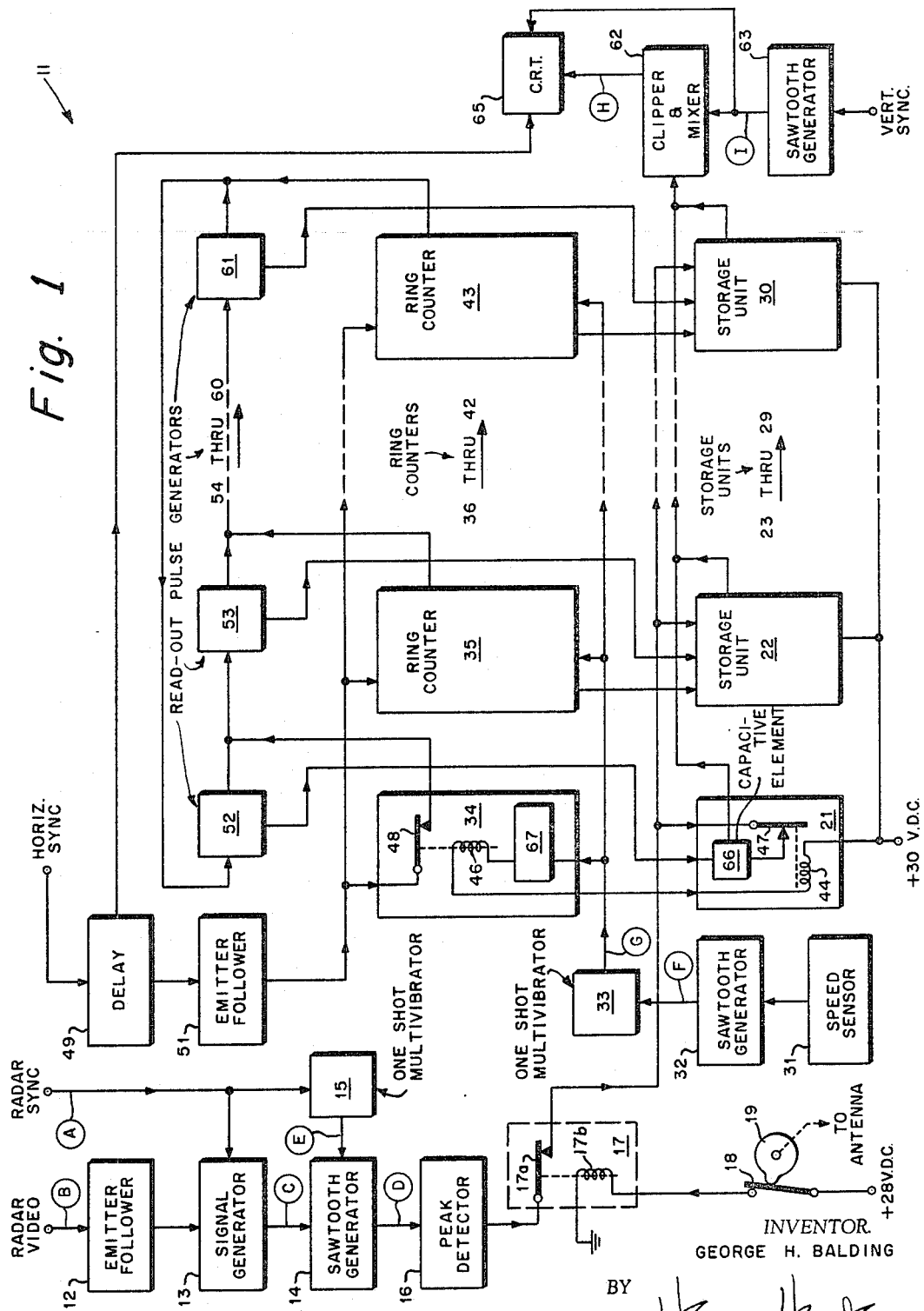
FIG. 1 illustrates in block diagram form a preferred embodiment of the present invention.

Referring now to FIG. 1, there is shown the radar data converter 11 of the present invention. Radar data converter 11 has two functional modes—the data storage mode, and the data display mode. Each mode may occur simultaneously but for purposes of clarity in structural presentation the two modes are discussed separately.

In the storage mode, the radar data converter 11 utilizes the radar sync signal and radar reflected pulse hereinafter referred to as the radar video for storing in a plurality of storage units signals for later display of a terrain profile extending along the azimuth heading of the aircraft. The radar sync signal shown in line A of FIG. 2a has a pulse repetition frequency of 1200 pulses per second. The radar sync pulse and the transmitted radar pulse (not shown in FIG. 2a) occur simultaneously so that the relative position of the radar video or reflected pulse with respect to the radar sync pulse is an indication of the slant range from the radar antenna to the target. This is so since the time between the transmission of the radar pulse and the return of the radar video is a measure of the slant range. The radar video is shown in FIG. 2a, line B.

The radar video and the return synch signals are utilized by the radar data converter of the present invention to provide signals bearing terrain profile information at the aircraft azimuth heading. The radar video is applied to a gate signal generator 13 through emitter follower 12 where it is modified to provide a gate signal. Gate signal generator 13 comprises a bistable multivibrator wherein the radar sync pulse is applied as shown to trigger one side of the multivibrator while the radar video is used to trigger the other side, thereby providing a waveform like that shown in line C of FIG. 2a which is a modified radar video signal or a gate signal with the leading edge of the gate occurring at a time determined by the radar video and the trailing edge determined by the next radar sync pulse. Since it is the radar video or reflected radar pulse which determines range, a larger gate width signifies a target that is close to the aircraft while a smaller gate is generated by more distant echoes.

Figure 2A:
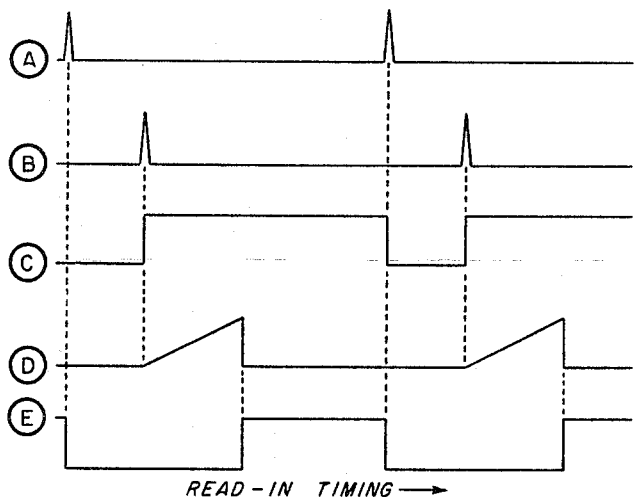
FIGS. 2a and 2b are representations of the timing relationship between some of the waveforms used in the present invention.

The modified radar video provides an input to the range sawtooth generator 14 which starts the sawtooth generator in operation, and thereby provides a waveform like that shown in line D of FIG. 2a. The amplitude of the range sawtooth voltage is determined by the duration of the range sawtooth which is restricted to 149 microseconds by one-shot multivibrator 15 as shown in line E of FIG. 2a. One-shot multivibrator 15 which is triggered by the radar sync pulse cuts off range sawtooth generator 14 after 149 microseconds. The pulse width of the one-shot multivibrator 15 is selected so as to keep the amplitude of the sawtooth voltage to a level which is commensurate with the dynamic range capability of the peak detector 16 and the storage units 21 through 30. Range sawtooth generator 14 provides the range sawtooth as an input to peak detector 16 which generates a D.C. voltage having an amplitude which varies with the peak voltage of the range sawtooth. Thus, the output of peak detector 16 provides a D.C. voltage which varies in direct relationship with range to the target.

The D.C. voltage from peak detector 16 is fed to storage units 21 through 30 via switch 17a of the relay 17. Switch 17a of relay 17 is closed only during the time that the radar antenna is at zero azimuth heading. This is accomplished by energizing relay coil 17b of relay 17 from a source of voltage which is connected to relay coil 17b each time the radar antenna passes the zero azimuth position which is the heading of the aircraft. This may be accomplished by closing a switch 18 each time the radar antenna passes zero azimuth heading of the aircraft by means of a cam 19 mechanically connected to the radar antenna system. This connects a 28 volt D.C. source to ground through relay coil 17b.

The D.C. level voltage from peak detector 16 is stored in capacitive elements represented by small block 66 which are contained in each of the storage units 21 through 30. The storage units in which the information is stored are selected as a function of aircraft airspeed in an manner to be more fully described hereinbelow.

Figure 2B:
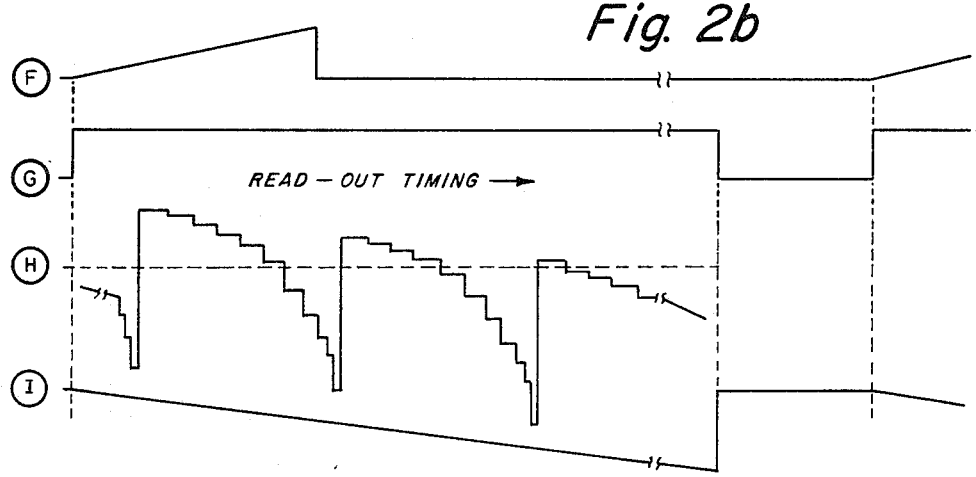

An external aircraft speed sensor 31 is connected to a variable controlled sawtooth generator 32 for varying the output frequency of sawtooth generator 32 as a function of aircraft speed; that is, speed sensor 31 detects the speed of the aircraft and produces a voltage which is coupled to sawtooth generator 32 and causes the output frequency of the sawtooth generator to vary accordingly, as shown in line F of FIG. 2b. For example, if the aircraft's speed increases, the frequency of the sawtooth generator 32 will also increase; but if the aircraft speed decreases, the frequency of the sawtooth generator will also decrease. The sawtooth output of sawtooth generator 32 is used to trigger a one-shot multivibrator 33 once per sawtooth and triggering occurs at a low predetermined threshold voltage level of the one-shot multivibrator, as shown in line G of FIG. 2b. The sawtooth generator 32 is used to provide a positive-going signal to actuate the one-shot multivibrator 33. The sawtooth generator therefore provides a definite and positive triggering of the one-shot multivibrator 33 even though the output signal from the speed sensor 31 is decreasing as a result of a decrease in airspeed. The output of multivibrator 33 is coupled to the inputs of ten ring counters generally indicated by reference numerals 34 through 43. The actual ring counters (illustrated by block 67 shown with reference to ring counter 34) form only a portion of each of blocks 34 through 43 but for purposes of illustration blocks 34 through 43 are referred to as the ring counters.

Ring counter 34 is initially on when the system is turned on. The first pulse from multivibrator 33 causes ring counter 35 to be turned on which in turn turns ring counter 34 off. The next pulse from multivibrator 33 simultaneously triggers ring counter 36 on and 35 off. This action continues switching on each ring counter in succession until all ten have been triggered, then the sequence begins again. The function of this circuitry is to provide a switching sequence as a function of aircraft speed.

When ring counter 34 is on, the D.C. voltage which is a function of the slant range to a target is coupled to storage unit 21. When a pulse from multivibrator 33 turns ring counter 35 on and ring counter 34 off, range information is then coupled from peak detector 16 into storage unit 22. This action is continued with each ring counter switching the D.C. range voltage to each successive one of the ten storage units 21 through 30.

When ring counter 34 is on, relay coils 44 and 46 are energized closing switches 47 and 48 as shown. Thus, when ring counter 34 is on, the output from peak detector 16 is coupled to storage unit 21. The function of relay coil 46 and switch 48 is discussed more fully hereinbelow. As each ring counter is turned on in succession, the output from peak detector 16 is fed into its associated storage unit by means of relay and switch arrangements similar to those discussed with respect to storage unit 21.

In the readout mode of operation, a horizontal sync pulse is fed through a delay 49 to emitter follower 51. Delay 49 is inserted to initiate readout after the trailing edge of blanking. The output of emitter follower 51 is coupled to the switch arm of ten relays contained in ring counters 34 through 43 similar to the relay comprising coil 46 and switch 48 associated with ring counter 34 as illustrated therewith. The ten relays are actuated in turn as a function of aircraft speed by the same ring counter circuitry used to switch the D.C. range voltage from peak detector 16 to the storage units 21 through 30. As each of the ten relays is actuated in turn, the horizontal sync pulse from the emitter follower 51 is coupled into the input of one of the ten readout pulse generators or multivibrators 52 through 61 which are respectively coupled to storage units 21 through 30. This action triggers the readout pulse generator or multivibrator into which the horizontal pulse is coupled which in turn triggers the next readout pulse generator or multivibrator and so on until all ten have been triggered. When the last readout pulse generator 61 is triggered, its trigger pulse to the first readout pulse generator 52 is attenuated stopping the ring. The next horizontal sync pulse then triggers the first readout pulse generator in restarting the cycle. The result of this action is to readout the information that is being stored at the horizontal rate while the horizontal sync input is advancing to the different inputs of readout generators 52 through 61 as a function of aircraft speed, with the information that is being stored being the last to be read out in each horizontal scan. For example, when information is being stored into storage unit 21, it is being read out by the readout pulse fed to storage unit 21 from readout pulse generator 52. With the sync pulse coupled into the input circuit for generator 53, the generator 52 will be the last to read out in relation to the horizontal sync. This manner of readout results in the movement of the terrain across the screen of the display cathode ray tube from right to left as a function of aircraft speed.

As the stored range information from each of the storage units 21 through 30 is read out by the readout pulse from readout pulse generators 52 through 61 at the horizontal sync rate, for example 525 times per vertical sweep as in a standard television system, this information is coupled to a clipper and mixer circuit 62.

The clipper and mixer circuit 62 performs two functions: namely, to combine (mix) the stored range information with the negative sawtooth (shown in FIG. 2b, line I) originating from a sawtooth generator 63, and to clip (or inhibit) signals less than a predetermined level and to pass signals above this predetermined level. At the beginning of the vertical sawtooth (bottom of the scan display) the D.C. level of the stored range information is such that nearly all the signal is passed by the clipper whereas, as the vertical sawtooth slope becomes more negative, less of the stored range information is passed through the clipper. This condition continues until the sawtooth level falls to a point at which time only the most positive portion of the stored range information exceeds the clipping level. FIGURE 2b, line H illustrates this condition in which with each succeeding horizontal sweep, a smaller and smaller portion of the stored range information is allowed to pass into the cathode ray tube 65. Accordingly, less and less of the display is brightened during each horizontal sweep. If an obstacle is ahead of the aircraft, the peak voltage at some point (depending on the radar range to the obstacle) in the stored range information is much greater than the clipping level and consequently the display brightens at a corresponding higher point to indicate the terrain obstacle.

As shown in FIG. 1, a portion of the horizontal sync information from delay 49 is coupled to the horizontal plates of the C.R.T. 65 while a portion of the vertical sawtooth from sawtooth generator 63 is coupled to the vertical plates of the C.R.T. 65. In this manner, both horizontal and vertical deflection of the C.R.T. is achieved at the rate selected by the horizontal and vertical sync signals, respectively. For example, the horizontal sync signals may appear at a rate of 525 pulses per vertical sweep, and the vertical sweep appearing at a rate of 30 cycles per second, with a two to one interlace so as to eliminate any perceptible flicker.

The output from the clipper and mixer circuit 62 is coupled to the C.R.T. grid so as to control the brightness of the display, as a function of the horizontal sweep, with the position of the display being determined by the vertical sweep.

In the readout mode of operation then, the D.C. voltage stored on storage units 21 through 30 are read out at the horizontal sweep rate while the horizontal sync input is advancing to the different inputs of readout generators 52 through 61 as a function of aircraft speed.

Figure 3:
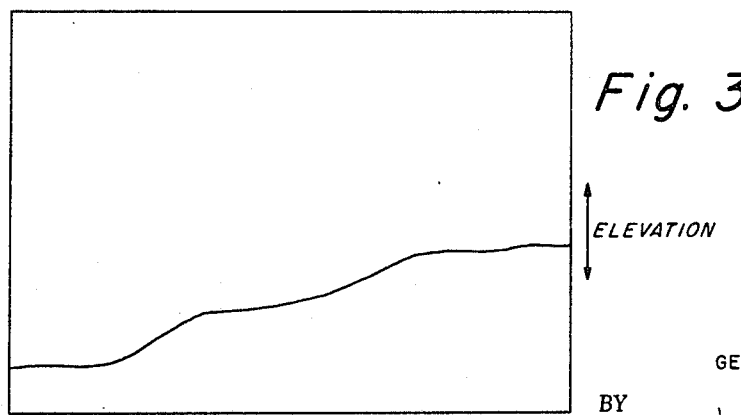
FIG. 3 illustrates an example of a typical display of a terrain profile provided by the present invention.

The D.C. voltages are mixed with the vertical sawtooth voltage from sawtooth generator 63 passed through the clipper and then applied to the grid of C.R.T. 65 thereby causing the display to brighten or darken (as a function of terrain) at a correspondingly higher point (as a function of the vertical sawtooth) on the display to indicate the terrain profile as illustrated in FIG. 3.

FIG. 3 illustrates the presentation appearing on the face of cathode ray tube 65 showing the irregular line which represents earth elevation as a function of range which moves from the right to left at a rate proportional to aircraft speed. It is pointed out that as the aircraft continues on in the same heading the shape of the irregular line changes in accordance with the terrain profile at the azimuth heading as the earth is being scanned by the aircraft antenna as it moves with the aircraft without actually scanning in the vertical direction with respect to the aircraft.

Obviously many modifications and variations of the present invention are possible in the light of the above teachings. It is therefore to be understood that within the scope of the appended claims the invention may be practiced otherwise than as specifically described.

What is claimed is:

1. A radar data converter for use with an aircraft radar system having no antenna vertical scan capability providing a display of terrain profile at the aircraft azimuth heading, comprising in combination:

sawtooth generator means providing a range sawtooth voltage output having an amplitude which is a function of range to the target, peak detector means connected to said sawtooth generator means providing a D.C. voltage output having an amplitude which varies directly with the peak voltage of said range sawtooth, a plurality of storage means, first relay means coupling said peak detector means to said plurality of storage means when the radar antenna is aligned with aircraft heading, second relay means connected between said first relay means and each of said plurality of storage means coupling the output of said peak detector means successively to each of said plurality of storage means at a rate proportional to aircraft speed whereby the output voltage of said peak detector means which is proportional to range is successively stored in each of said plurality of storage means at a rate proportional to aircraft velocity.

2. A radar data converter for use with an aircraft radar system having no antenna vertical scan capability providing a display of terrain profile at the aircraft azimuth heading, comprising in combination:

sawtooth generator means providing a range sawtooth voltage output having an amplitude which is a function of range to the target, peak detector means connected to said sawtooth generator means providing a D.C. voltage output having an amplitude which varies directly with the peak voltage of said range sawtooth generator means, a plurality of storage means, an equal plurality of relay means respectively connected between said peak detector means and each of said plurality of storage means, pulse generator means generating pulses at a rate proportional to aircraft velocity, counter circuit means connected between said pulse generator means and said plurality of relay means causing each of said relay means to be energized successively by successive pulses from said pulse generator means whereby the output voltage of said peak detector means is successively coupled to and stored in each of said plurality of storage means.

3. A radar data converter for use with an aircraft radar system having no antenna vertical scan capability providing a display of terrain profile at the aircraft azimuth heading, comprising in combination:

first sawtooth generator means providing a range sawtooth voltage output having an amplitude which is a function of range to the target, peak detector means connected to said first sawtooth generator means providing a D.C. voltage output having an amplitude which varies directly with the peak voltage of said range sawtooth generator means, a plurality of storage means, first relay means coupling said peak detector means to said plurality of storage means when the radar antenna is aligned with aircraft heading, second relay means connected between said first relay means and each of said plurality of storage means coupling the output of said peak detector means successively to each of said plurality of storage means at a rate proportional to aircraft speed, output circuit means connected to each of said plurality of storage means, multivibrator means connected to each of said plurality of storage means pulsing each of said plurality of storage means at a predetermined rate with a readout pulse providing output voltages representative of said range voltage stored in each of said plurality of storage means to said output circuit means, cathode ray tube means, mixer circuit means connected between said cathode ray tube means and said output circuit means, second sawtooth generator means connected to said mixer circuit means providing said mixer circuit means with a linear sawtooth voltage at the vertical sweep rate of said cathode ray tube means whereby said cathode ray tube means provides a display of terrain profile at the aircraft azimuth heading.

4. A radar data converter for use with an aircraft radar system having no antenna vertical scan capability providing a display of terrain profile at the aircraft azimuth heading, comprising in combination:

first sawtooth generator means providing a range sawtooth voltage output having an amplitude which is a function of range to the target, peak detector means connected to said first sawtooth generator means providing a D.C. voltage output having an amplitude which varies directly with the peak voltage of said range sawtooth generator means, a plurality of storage means, an equal plurality of relay means respectively connected between said peak detector means and each of said plurality of storage means, pulse generator means generating pulses at a rate proportional to aircraft velocity, counter circuit means connected between said pulse generator means and said plurality of relay means causing each of said plurality of relay means to be energized successively by successive pulses from said pulse generator means, output circuit means connected to each of said plurality of storage means, multivibrator means connected to each of said plurality of storage means pulsing each of said plurality of storage means at a predetermined rate with a readout pulse providing output voltages representative of said range voltage stored in each of said plurality of storage means to said output circuit means, cathode ray tube means, mixer circuit means connected between said cathode ray tube means and said output circuit means, second sawtooth generator means connected to said mixer circuit means providing said mixer circuit means with a linear sawtooth voltage at the vertical sweep rate of said cathode ray tube means whereby said cathode ray tube means provides a display of terrain profile at the aircraft azimuth heading.

5. A radar data converter for use with an aircraft radar system having no antenna vertical scan capability providing a display of terrain profile at the aircraft azimuth heading, comprising in combination:

sawtooth generator means providing a range sawtooth voltage output having an amplitude which is a function of range to the target, peak detector means connected to said sawtooth generator means providing a D.C. voltage output having an amplitude which varies directly with the peak voltage of said range sawtooth generator means, a plurality of ring counter means, each of said plurality of ring counter means having an OFF state and an ON state, a like plurality of storage means connected to respective ones of said plurality of ring counter means and to said peak detector means, a plurality of relay means disposed between said peak detector means and each of said plurality of storage means coupling the output voltage of said peak detector means to successive ones of said plurality of storage means when the associated one of said plurality of ring counter means is in the ON state, pulse generator means providing a pulse output at a rate proportional to aircraft velocity for successively turning each of said ring counter means to the ON state whereby said plurality of relay means are successively energized at a rate proportional to aircraft speed.

6. A radar data converter for use with an aircraft radar system having no antenna vertical scan capability providing a display of terrain profile at the aircraft azimuth heading, comprising in combination:

first sawtooth generator means providing a range sawtooth voltage output having an amplitude which is a function of range to the target, peak detector means connected to said first sawtooth generator means providing a D.C. voltage output having an amplitude which varies directly with the peak voltage of said range sawtooth generator means, a plurality of ring counter means, each of said plurality of ring counter means having and OFF state and an ON state, a like plurality of storage means connected to respective ones of said plurality of ring counter means and to said peak detector means, a plurality of relay means disposed between said peak detector means and each of said plurality of storage means coupling the output voltage of said peak detector means to successive ones of said plurality of storage means when the associated one of said plurality of ring counter means is in the ON state, pulse generator means providing a pulse output at a rate proportional to aircraft velocity for successively turning each of said ring counter means to the ON state, output circuit means connected to each of said plurality of storage means, multivibrator means connected to each of said plurality of storage means pulsing each of said plurality of storage means at a predetermined rate with a readout pulse providing output voltages representative of said range voltage stored in said plurality of storage means to said output circuit means, cathode ray tube means, mixer circuit means connected between said cathode ray tube means and said output circuit means, second sawtooth generator means connected to said mixer circuit means providing said mixer output means with a linear sawtooth voltage at the vertical sweep rate of said cathode ray tube means whereby said cathode ray tube means provides a display of a range profile at the aircraft azimuth heading.

7. A radar data converter for use with an aircraft radar system having no antenna vertical scan capability providing a display of terrain profile at the aircraft azimuth heading, comprising in combination:

sawtooth generator means providing a range sawtooth voltage output having an amplitude which is a function of range to the target, peak detector means connected to said sawtooth generator means providing a D.C. voltage output having an amplitude which varies directly with the peak voltage of said range sawtooth generator means, a plurality of storage means, an equal plurality of relay means respectively connected between said peak detector means and each of said plurality of storage means, means maintaining said plurality of relay means disconnected from said peak detector means until the radar antenna is aligned with aircraft heading, pulse generator means generating pulses at a rate proportional to aircraft velocity, counter circuit means connected between said pulse generator means and said plurality of relay means causing each of said plurality of relay means to be energized successively by successive pulses from said pulse generator means whereby the output voltage of said peak detector means is successively coupled to and stored in each of said plurality of storage means.

8. A radar data converter for use with an aircraft radar system having no antenna vertical scan capability providing a display of terrain profile at the aircraft azimuth heading, comprising in combination:

first sawtooth generator means providing a range sawtooth voltage output having an amplitude which is a function of range to the target, peak detector means connected to said first sawtooth generator means providing a D.C. voltage output having an amplitude which varies directly with the peak voltage of said range sawtooth generator means, a plurality of storage means, an equal plurality of relay means respectively connected between said peak detector means and each of said plurality of storage means, mean maintaining said plurality of relay means disconnected from said peak detector means until the radar antenna is aligned with aircraft heading, pulse generator means generating pulses at a rate proportional to aircraft velocity, counter circuit means connected between said pulse generator means and said plurality of relay means causing each of said relay means to be energized successively by a successive pulses from said pulse generator means, output circuit means connected to each of said plurality of storage means, multivibrator means connected to each of said plurality of storage means pulsing each of said plurality of storage means at a predetermined rate with a readout pulse providing output voltages representative of said range voltage stored in each of said plurality of storage means to said output circuit means,
cathode ray tube means,
mixer circuit means connected between said cathode ray tube means and said output circuit means,
second sawtooth generator means connected to said mixer circuit means providing said mixer circuit means with a linear sawtooth voltage at the vertical sweep rate of said cathode ray tube means whereby said cathode ray tube means provides a display of terrain profile at the aircraft azimuth heading.

9. A radar data converter for use with an aircraft radar system having no antenna vertical scan capability providing a display of terrain profile at the aircraft azimuth heading, comprising in combination:
sawtooth generator means providing a range sawtooth voltage output having an amplitude which is a function of range to the target,
peak detector means connected to said sawtooth generator means providing a D.C. voltage output having an amplitude which varies directly with the peak voltage of said range sawtooth generator means,
a plurality of ring counter means,
each of said plurality of ring counter means having an OFF state and an ON state,
a like plurality of storage means connected to respective ones of said plurality of ring counter means and to said peak detector means,
means maintaining said peak detector means disconnected from said plurality of storage means until the radar antenna is aligned with aircraft heading,
a plurality of relay means disposed between said peak detector means and each of said plurality of storage means coupling the output voltage of said peak detector means to successive ones of said plurality of storage means when the associated one of said plurality of ring counter means is in the ON state,
pulse generator means providing a pulse output at a rate proportional to aircraft velocity for successively turning each of said plurality of ring counter means to the ON state whereby said plurality of relay means are successively energized at a rate proportional to aircraft speed.

10. A radar data converter for use with an aircraft radar system having no antenna vertical scan capability providing a display of terrain profile at the aircraft azimuth heading, comprising in combination:

first sawtooth generator means providing a range sawtooth voltage output having an amplitude which is a function of range to the target,
peak detector means connected to said first sawtooth generator means providing a D.C. voltage output having an amplitude which varies directly with the peak voltage of said range sawtooth generator means,
a plurality of ring counter means,
each of said plurality of ring counter means having an OFF state and an ON state,
a like plurality of storage means connected to respective ones of said plurality of ring counter means and to said peak detector means,
means maintaining said peak detector means disconnected from said plurality of storage means until the radar antenna is aligned with aircraft heading,
a plurality of relay means disposed between said peak detector means and each of said plurality of storage means coupling the output voltage of said peak detector means to successive ones of said plurality of storage means when the associated one of said plurality of ring counter means is in the ON state,
pulse generator means providing a pulse output at a rate proportional to aircraft velocity for successively turning each of said plurality of ring counter means to the ON state,
output circuit means connected to each of said plurality of storage means,
multivibrator means connected to each of said plurality of storage means pulsing each of said plurality of storage means at a predetermined rate with a readout pulse providing output voltage representative of said range voltage stored in each of said plurality of storage means to said out circuit means,
cathode ray tube means,
mixer circuit means connected between said cathode ray tube means and said output circuit means,
second sawtooth generator means connected to said mixer circuit means providing said mixer circuit means with a linear sawtooth voltage at the vertical sweep rate of said cathode ray tube means whereby said cathode ray tube means provides a display of terrain profile at the aircraft azimuth heading.

No references cited.

CHESTER L. JUSTUS, *Primary Examiner.*

P. M. HINDERSTEIN *Assistant Examiner.*